US005574752A

United States Patent [19]
Juri

[11] Patent Number: 5,574,752
[45] Date of Patent: Nov. 12, 1996

[54] MOVING IMAGE DATA TRANSMITTER AND RECEIVER FRAME SYNCHRONIZATION

[75] Inventor: Tatsuro Juri, Osaka, Japan

[73] Assignee: Matsushita Electric Industrial Co., Ltd., Osaka, Japan

[21] Appl. No.: 511,320

[22] Filed: Aug. 4, 1995

Related U.S. Application Data

[63] Continuation of Ser. No. 234,377, Apr. 28, 1994, abandoned.

[30] Foreign Application Priority Data

Apr. 28, 1993 [JP] Japan ................................. 5-102363

[51] Int. Cl.$^6$ ............................ H04N 5/067; H04L 7/00
[52] U.S. Cl. ..................... 375/354; 348/464; 348/524; 348/513; 375/365; 370/105.1
[58] Field of Search .................................. 375/354, 365; 370/105.1; 348/513, 521, 524, 526, 500, 464, 423; H04N 5/067

[56] References Cited

U.S. PATENT DOCUMENTS

| | | | |
|---|---|---|---|
| 3,795,763 | 3/1974 | Golding et al. | 348/392 |
| 4,066,964 | 1/1978 | Costanza et al. | 375/260 |
| 4,353,090 | 10/1982 | Broadbent | 358/342 |
| 4,631,586 | 12/1986 | Gennetten et al. | 348/495 |
| 4,759,040 | 7/1988 | Kawata et al. | 370/105.1 |
| 4,790,013 | 12/1988 | Kage | 375/114 |
| 4,843,455 | 6/1989 | Suzuki | 348/393 |
| 5,007,088 | 4/1991 | Ooi et al. | 370/105.1 |
| 5,124,985 | 6/1992 | Hoshikawa | 370/30 |
| 5,260,978 | 11/1993 | Fleischer et al. | 375/354 |
| 5,274,681 | 12/1993 | Yamada et al. | 375/372 |

FOREIGN PATENT DOCUMENTS

WO91/11074 7/1991 WIPO.

OTHER PUBLICATIONS

EBU Technical Review, vol. 234, Apr. 1989, pp. 81–85, "EBU Serial Analogue Component interface for the Interconnection of Digital Islands (625–line Video Signals)".
Proceedings of the 6th Mediterranean Electrotechnical Conference, vol. 1, May 1991, pp. 435–438, M. S. Pereiro et al., "Video, sampling and network synchronisation in a TV codec".
Signal Processing: Image Communication, vol. 4, No. 2, Apr. 1992, pp. 153–159, A. G. Macinnis, "The MPEG systems coding specification".
Electronics and Communications in Japan, Part I: Communications, vol. 75, No. 2, Feb. 1992, pp. 11–23, T. Kinoshita et al., "Synchronization and multiplexing of HDTV signals for transmission in broadband ISDN".

Primary Examiner—Stephen Chin
Assistant Examiner—Jeffrey W. Gluck
Attorney, Agent, or Firm—Wenderoth, Lind & Ponack

[57] ABSTRACT

Before transmission of moving image data, the period of a frame of the moving image data is counted using a clock signal used for the transmission to produce a frame count. The moving image data is then transmitted along with the frame count so that it can correctly be timed in frames at receiver.

21 Claims, 2 Drawing Sheets

MOVING IMAGE DATA TRANSMITTER AND RECEIVER FRAME SYNCHRONIZATION

This application is a continuation of now abandoned application, Ser. No. 08/234,377, filed Apr. 28, 1994.

BACKGROUND OF THE INVENTION

1. Field of the Invention

The present invention relates to a data transmitter apparatus and a data receiver apparatus between which desired data of, e.g. a moving image, is transferred.

2. Description of the Prior Art

As digital communication technologies being advanced, a variety of transmitter apparatus have been developed for transferring digital data of a moving image through a transmission channel. FIG. 5 shows one such prior art arrangement for transmitting moving image data through a digital transmission channel, in which a transmitter 501 in a data transmitter apparatus 1 is coupled by a digital transmission channel 502 to a data receiver apparatus 2. The data receiver apparatus 2 comprises a clock reproducer 503 and a receiver 504.

In operation, the moving image data in digital form is transmitted as a stream of bits from the transmitter apparatus 1 via the transmission channel 502 to the clock reproducer 503 in the receiver apparatus 2. At the clock reproducer 503, a clock signal synchronized with the bit stream is reproduced from the transmitted data. The transmitted or input data is processed by the receiver 504 with synchronization with the clock signal to reconstruct an original image.

In such a manner, moving image data can be transferred through the digital transmission channel.

However, the processing of the input image data at the receiver apparatus 2 shown in FIG. 5 is controlled by the clock signal which is synchronous with a clock signal for data transmission through the transmission channel 502. More particularly, a frame synchronizing signal for reproducing the moving image is timed with the transmission clock signal. Accordingly, a frame synchronizing signal at the transmitter apparatus 1 has to be synchronous with the transmission clock signal.

When the transmission channel 502 is connected to a plurality of asynchronous motion image data output apparatuses, its clock signal can be synchronized with only one of the apparatuses, thus preventing the remaining apparatuses from being simultaneously operated.

SUMMARY OF THE INVENTION

It is an object of the present invention to provide a data transmitter apparatus and a data receiver apparatus between which a plurality of data, such as moving image data, are simultaneously transferred.

A data transmitter apparatus for transmitting moving image data through a digital transmission channel, according to a first aspect of the present invention, comprises: a counter for counting a frame pulse which is inputted together with the moving image data and indicates a frame of a moving image in synchronization with a transmission clock signal used for transmission through the digital transmission channel to produce a frame count which indicates the frame of the moving image; a data mixer for merging the frame count with the moving image data to produce a composite data; and a transmitter for transmitting the composite data produced by the data mixer.

In operation, the frame count determined by counting the frame period in synchronization with the transmission clock signal is transmitted. As a result, even if a clock signal used at the transmitter apparatus for signal processing is not synchronous with the transmission clock signal, the frame period can successfully be reconstructed using the transmission clock signal. The present invention allows the transmission clock signal to cooperate with a signal processing clock asynchronously between the transmitter apparatus and the receiver apparatus.

A data transmitter apparatus for transmitting moving image data through a digital transmission channel to a data receiver apparatus, according to a second aspect of the present invention, comprises: a counter for counting a frame period of the moving image data or a multiple of a divisor of the frame period in synchronization with a transmission clock signal used for transmission through the digital transmission channel to produce a frame count; a difference generator for generating a difference between the frame count and a reference corresponding to a reference to be used by the data receiver apparatus; a data mixer for merging the difference with the moving image data to produce a composite data; and a transmitter for transmitting the composite data produced by the data mixer.

In operation, a difference between the frame count and the frame period reference which is common to both the transmitter and receiver apparatuses is transmitted. As the frame period of any moving image data asynchronous with the transmission clock signal is approximately that of the reference, the difference between the frame count and reference is quite small in value. Therefore, the amount of data to be transmitted will be reduced considerably.

A data transmitter apparatus for transmitting moving image data through a digital transmission channel, according to a third aspect of the present invention, comprises: a counter for counting the period of a frame of the moving image data or a multiple of a divisor of the frame period in synchronization with a transmission clock signal used for transmission through the digital transmission channel to produce a frame count; a lower-bit generator for separating a specific number of lower bits from the frame count produced by the counter; a data mixer for merging the lower bits with the moving image data to produce a composite data; and a transmitter for transmitting the composite data produced by the data mixer.

Since the lower bits of the frame count, like the difference, are transmitted with the motion image data, the overall data to be transmitted will be comparatively decreased.

DESCRIPTION OF THE PREFERRED EMBODIMENTS

Preferred embodiments of the present invention will be described referring to the accompanying drawings.

Figure 1:
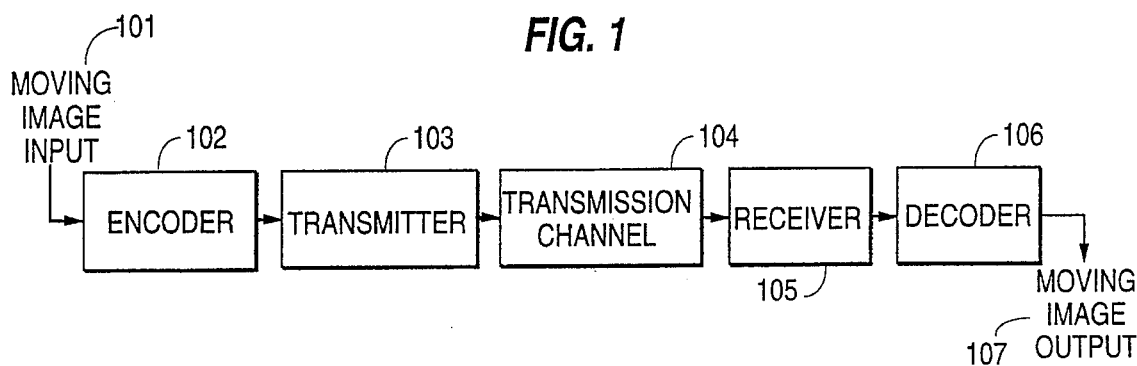
FIG. 1 is a block diagram of a transmitter apparatus and a receiver apparatus according to the present invention.

FIG. 1 is a block diagram of a data transmitter and receiver system comprising a data transmitter apparatus and a data receiver apparatus according to the present invention. As shown in FIG. 1, a moving image input 101, an encoder 102, a transmitter 103, a transmission channel 104, a receiver 105, a decoder 106, and a moving image output 107 are provided.

Moving image data, fed to the moving image input 101, is supplied into the encoder 102 where it is encoded to coded digital form. The coded moving image data is transferred along with frame period information for the moving image data through the transmission channel 104. At the receiver 105, the coded moving image data is separated from the frame period information and fed to the decoder 106. Simultaneously, the frame period information is processed in the receiver 105 for reproducing a frame pulse signal. The decoder 106 decodes the coded moving image data using the frame pulse signal to reconstruct the original moving image data which is further transmitted from the moving image output 107.

Figure 2:
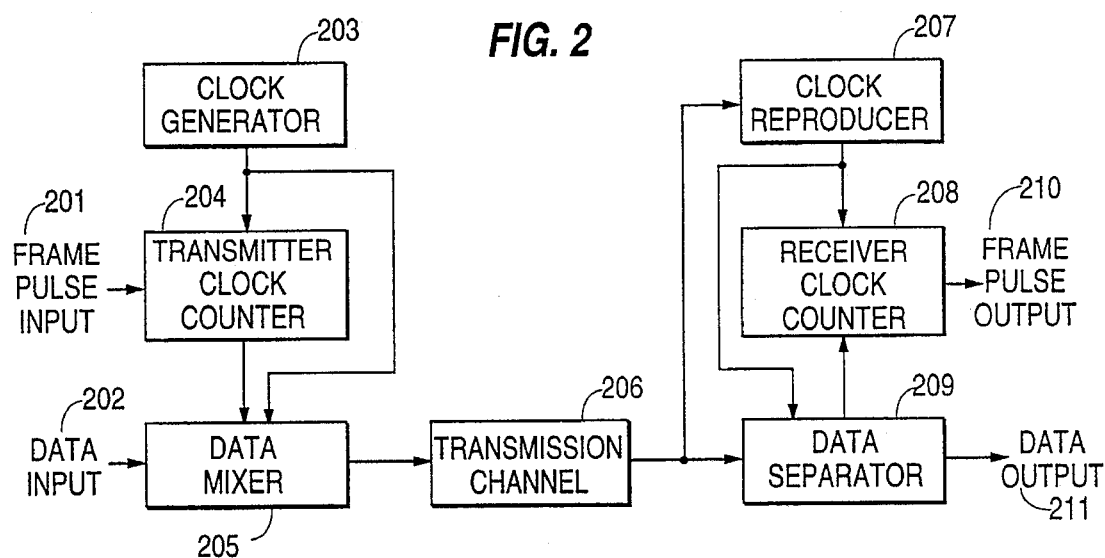
FIG. 2 is a block diagram of a transmitter in the transmitter apparatus and a receiver in the receiver apparatus in accordance with a first embodiment of the present invention.

FIG. 2 is a block diagram showing a first embodiment of a transmitter and a receiver. As shown in FIG. 2, a frame pulse input 201, a data input 202, a clock generator 203, a transmitter clock counter 204, a data mixer 205, a transmission channel 206, a clock reproducer 207, a receiver clock counter 208, a data separator 209, a frame pulse output 210, and a data output 211 are provided. More specifically, the elements to the left of the transmission channel 206 in FIG. 2 comprise the transmitter in the elements of the transmitter apparatus, and the elements to the right thereof comprise the receiver in the receiver apparatus.

A frame pulse indicating the start time of a moving image frame is fed from the frame pulse input 201 to the clock counter 204 where a count is updated by a transmission clock signal emitted from the clock generator 203 upon detecting the input of the frame pulse. More particularly, the input period of the frame pulse is defined by a number of transmission clock pulses which is referred to as a frame count. The frame count is merged at the data mixer 205 with the moving image data supplied from the moving image input 202. A resultant stream of bits from the data mixer 205 is transferred through the transmission channel 206 as synchronized with the transmission clock signal emitted from the clock generator 203.

The bit stream fed from the transmission channel 205 to the data receiver apparatus of the first embodiment is subjected to the clock reproducer 207 for separation and reconstruction of the transmission clock signal which is then sent to the data separator 209. At the data separator 209, the moving image data and the frame count are separated from each other using the transmission clock signal. The moving image data is transmitted directly to the data output 211 while the frame count is fed to the receiver clock counter 208 where the period of the frame pulse is reproduced by counting the frame count using the transmission clock signal. The reproduced frame pulse is then delivered from the frame pulse output 210 in synchronization with the moving image data from the data output 211.

According to the first embodiment, the period of a frame determined in the transmitter can be restored at the receiver. In the circuitry arrangement shown in FIG. 2, the processing of the moving image data need not be synchronous with the transmission clock signal employed for data transmission. Hence, any moving image data asynchronous with the transmission clock signal can be transmitted with equal success. More advantageously, a plurality of asynchronous moving image data signals can be transmitted simultaneously.

Figure 3:
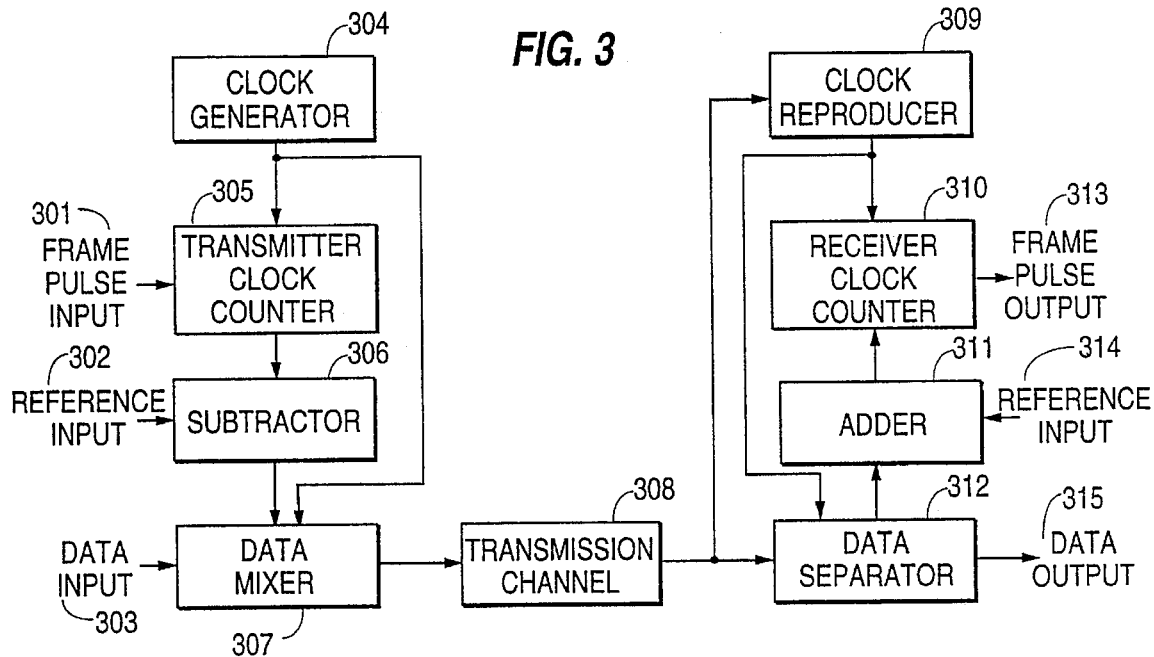
FIG. 3 is a block diagram of a transmitter in the transmitter apparatus and a receiver in the receiver apparatus in accordance with a second embodiment of the present invention.

FIG. 3 is a block diagram of a transmitter and a receiver of a second embodiment. As shown in FIG. 3, a frame pulse input 301, a reference input 302, a data input 303, a clock generator 304, a transmitter clock counter 305, a subtractor 306, a data mixer 307, a transmission channel 308, a clock reproducer 309, a receiver clock counter 310, an adder 311, a data separator 312, a frame pulse output 313, a reference input 314, and a data output 315 are provided. The elements to the left of the transmission channel 308 in FIG. 3 comprise the transmitter in the transmitter apparatus, and the elements to the right thereof comprise the receiver in the receiver apparatus.

A frame pulse indicating the start time of a frame in a moving image data is fed from the frame pulse input 301 in FIG. 3 to the clock counter 305. The clock counter 305 counts the duration of the frame pulse using a transmission clock signal emitted from the clock generator 304, thus producing a frame count. The frame count is transmitted to the subtractor 306 where it is reduced by a reference number supplied from the reference input 302 to calculate a difference. The difference is merged at the data mixer 307 with the moving image data supplied from the data input 303. A resultant stream of bits from the data mixer 307 is delivered to the transmission channel 308 in synchronization with the transmission clock signal emitted from the clock generator 304.

The bit stream fed from the transmission channel 308 to the data receiver apparatus of the second embodiment is subjected to the clock reproducer 309 for separation and reconstruction of the transmission clock signal which is then sent to the data separator 312. At the data separator 312, the transmission clock signal is used to separate the moving image data from the difference. The moving image data is transmitted directly to the data output 315 while the difference is fed to the adder 311 where it is added to the reference number supplied from the reference input 314 to reproduce the frame count. The reproduced frame count is then transferred to the receiver clock counter 310 where it is counted using the transmission clock signal from the clock generator 309 to restore the period of the frame pulse. The restored frame pulse is then delivered from the frame pulse output 313 in synchronization with the moving image data from the data output 315.

According to the second embodiment, the frame count is not transmitted but rather its difference from the reference which is stored in both the transmitter and the receiver is transmitted. It is known that the frame period of any asynchronous television signal of the existing TV system is found different by at best one percent from the reference. Therefore, as the difference between the frame count and the reference only is transmitted, the overall amount of data to be transferred for reproducing the frame period will be minimized. Also, even if the frame period is varied in length depending on its TV system, its data to be transmitted can be controlled to a uniform value as it is in the form of a difference from the reference.

Figure 4:
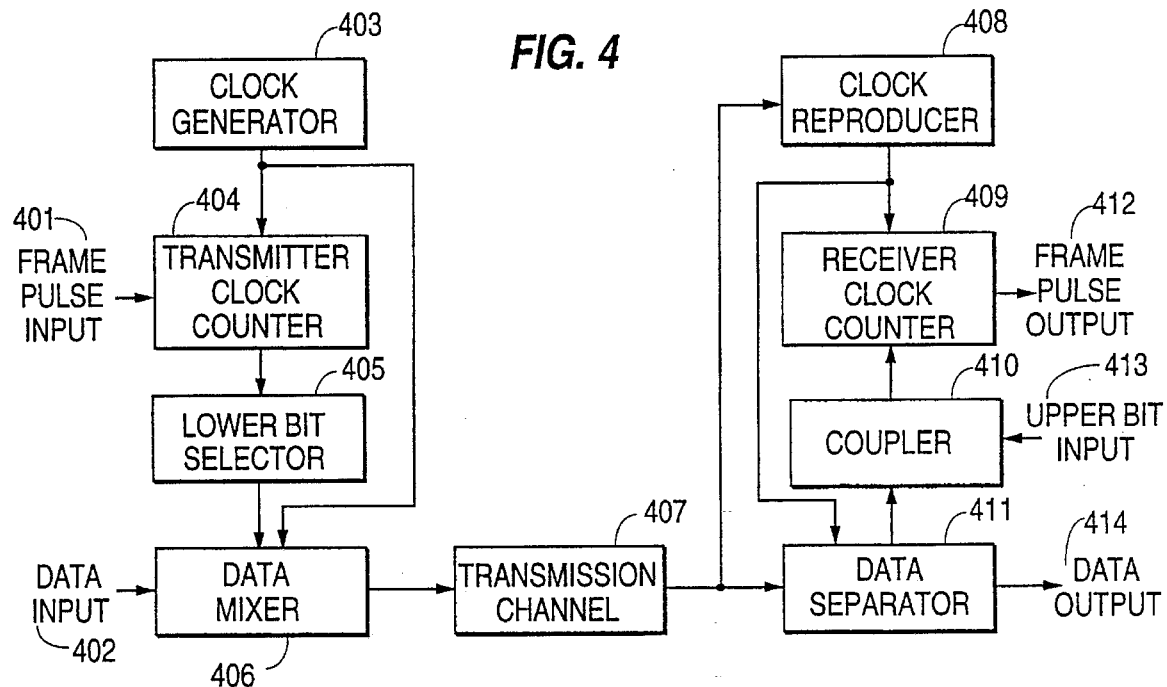
FIG. 4 is a block diagram of a transmitter in the transmitter apparatus and a receiver in the receiver apparatus in accordance with a third embodiment of the present invention.
Figure 5:
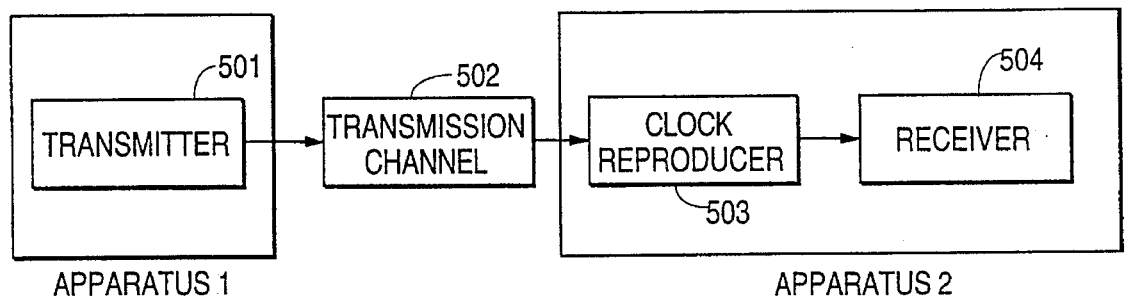
FIG. 5 is a block diagram of a prior art system.

FIG. 4 is a block diagram of a transmitter and a receiver of a third embodiment. As shown in FIG. 4, a frame pulse input 401, a data input 402, a clock generator 403, a transmitter clock counter 404, a lower-bit selector 405, a data mixer 406, a transmission channel 407, a clock reproducer 408, a receiver clock counter 409, a coupler 410, a data separator 411, a frame pulse output 412, an upper-bit input 413, and a data output 414 are provided. The elements to the left of the transmission channel 407 in FIG. 4 comprise the transmitter in the transmitter apparatus, and the elements to the right thereof comprise the receiver in the receiver apparatus.

A frame pulse indicating the start time of a frame in a moving image data is fed from the frame pulse input 401 in FIG. 4 to the clock counter 404. The clock counter 404 counts the duration of the frame pulse using a transmission clock signal emitted from the clock generator 403, thus producing a frame count. The frame count is transmitted to the lower-bit selector 405 where a specific number of lower bits are selectively extracted from all of the bits of the frame count. The selected lower bits are merged at the data mixer 406 with bits of the moving image data supplied from the data input 402. A resultant stream of bits from the data mixer 406 is delivered to the transmission channel 407 in synchronization with the transmission clock signal emitted from the clock generator 403.

The bit stream fed from the transmission channel 407 to the data receiver apparatus of the third embodiment is subjected to the clock reproducer 408 for separation and reconstruction of the transmission clock signal which is then sent to the data separator 411. At the data separator 411, the transmission clock signal is used to separate the bits of the moving image data from the lower bits. The bits of the moving image data are transmitted directly to the data output 414 while the lower bits are fed to the coupler 410 where they are coupled to the upper bits supplied from the upper-bit input 413 to reconstruct the frame count of binary form. The reconstructed frame count is then transferred to the receiver clock counter 409 where it is counted using the transmission clock signal from the clock generator 408 to restore the period of the frame pulse. The restored frame pulse is then delivered from the frame pulse output 412 in synchronization with the motion image data from the data output 414.

It is noted that, as previously described with the second embodiment, a difference between the actual frame period and its reference in common moving image data is so small that a particular number of lower bits of the frame count are sufficient to reconstruct the frame period at the receiver side using the reference.

Also, the reference for the frame period may be a product of a simple integer and a power of 2, which permits the circuitry arrangement to be facilitated. In this case, the reference of binary form is expressed its upper bits as a binary number and its lower bits as 0s. When the reference is made with its upper bits identical to the upper bits of the frame count determined at the clock counter 404 in the transmitter apparatus shown in FIG. 4, the lower bits of the frame count are usable as a difference from the reference.

It is now assumed that a television signal of 525/60 or 625/50 format is transmitted through the digital transmission channel at about 30 Mbit/sec according to the present invention. For example, the references for 525/60 and 625/50 formats of the frame period are predetermined respectively with a clock signal of 30 MHz as expressed by:

$30 \times 2^{15}$ or 11110 000000000000000B (525/60)

$36 \times 2^{15}$ or 100100 000000000000000B (625/50)

As apparent, each reference of a binary form comprises a binary number of upper bits and 0s of lower bits. Then, if the frame period is (Reference)+$\alpha$ ($0 \leq \alpha < 2^{15}$), the upper bits of the frame count (excluding 15 bits from the lower end) correspond to the upper bits of the reference. Hence, $\alpha$ is referred to as the difference. As the result, the frame count can be restored by substituting the lower bits (lowest 15 bits) of the reference with the difference $\alpha$.

As the upper bits of the frame count in the transmitter and the upper bits of the reference in the receiver are the same, the clock counters at both sides may be designed to count only lower bits except the upper bits for simplicity while utilizing data in the processor of moving image signals.

If the transmission clock signal is generally of $30 \times n$ MHz (n is an integer), the reference for the frame period may be determined as $30 \times 2^{15} \times n$ for a 525/60, 1125/60 or 1050/60 television signal format and $36 \times 2^{15} \times n$ for a 625/50 or 1250/50 television signal format.

As set forth above, the present invention allows data of the frame period to be transmitted to a receiver at an accuracy of the transmission clock signal. Accordingly, in case that the frame period is moderate in accuracy, its data to be transmitted can considerably be reduced in amount by providing a minimum of the frame count or difference thus requiring less size of the circuitry arrangement.

The present invention is also applicable to real-time transmission of data other than moving image data. The present invention is compatible with a variety of transmission methods, frequencies, and apparatuses and may be embodied in the form of software.

What is claimed is:

1. A data transmitter apparatus for transmitting moving image data through a digital transmission channel, comprising:

a clock generator for generating a transmission clock signal used for transmission through the digital transmission channel;

a counter responsive to a frame pulse which is inputted together with the moving image data at intervals of a frame of a moving image for counting clock pulses of the transmission clock signal during each of said intervals to produce a frame count which indicates a start time of the frame of the moving image counted by the clock pulses of the transmission clock signal;

a data mixer for merging the frame count with the moving image data to produce a composite data; and a transmitter for transmitting the composite data produced by the data mixer.

2. A data transmitter apparatus according to claim 1, wherein the frame count is reduced in accuracy before being transmitted.

3. A data receiver apparatus for receiving from a digital transmission channel a composite data which comprises moving image data and a frame count which indicates a start time of a frame of a moving image and has been determined by counting clock pulses of a transmission clock signal used for transmission through the transmission channel during an occurrence interval of a frame pulse which occurs at intervals of the frame of the moving image, comprising:

a clock reproducer for reproducing the transmission clock signal from the composite data;

a separator for separating the frame count from the composite data; and a frame reproducer for reproducing the frame pulse from the frame count in response to the reproduced transmission clock signal.

4. A data transmitter apparatus for transmitting moving image data through a digital transmission channel to a data receiver apparatus, comprising:

a counter for counting a frame period of the moving image data or a multiple of a divisor of the frame period in synchronization with a transmission clock signal used for transmission through the digital transmission channel to produce a frame count;

a difference generator for generating a difference between the frame count and a reference corresponding to a reference to be used by the data receiver apparatus;

a data mixer for merging the difference with the moving image data to produce a composite data; and a transmitter for transmitting the composite data produced by the data mixer.

5. A data transmitter apparatus according to claim 4, wherein if the transmission clock signal is (30×n) MHz, where n is an integer, the reference corresponding to a reference to be used by the data receiver apparatus is expressed as $30 \times 2^{15} \times n$ for a 525/60, 1125/60 or 1050/60 TV signal format and $36 \times 2^{15} \times n$ for a 625/50 or 1250/50 TV signal format.

6. A data transmitter apparatus according to claim 4, wherein the frame count or the difference is reduced in accuracy before being transmitted.

7. A data receiver apparatus for receiving from a digital transmission channel a composite data which comprises moving image data and a difference between a reference and a frame count determined by counting a frame period of the moving image data or a multiple of a divisor of the frame period in synchronization with a transmission clock signal used for transmission through the transmission channel, comprising:

a clock reproducer for reproducing the transmission clock signal from the composite data;

a separator for separating the difference from the composite data;

a frame count reproducer for reproducing the frame count by adding the difference to the reference; and a frame reproducer for reproducing the frame period from the frame count using the reproduced transmission clock signal.

8. A data transmitter apparatus for transmitting image data through a digital transmission channel to a data receiver apparatus comprising:

a clock generator for generating a transmission clock signal used for transmission through the digital transmission channel;

a counter responsive to a frame pulse which is inputted together with the moving image data at intervals of a frame of a moving image for counting clock pulses of the transmission clock signal during each of said intervals to produce a frame count which indicates a start time of the frame of the moving image counted by the clock pulses of the transmission clock signal;

a lower-bit generator for separating a specific number of lower bits from the frame count produced by the counter;

a data mixer for merging the lower bits with the moving image data to produce a composite data; and a transmitter for transmitting the composite data produced by the data mixer.

9. A data transmitter apparatus according to claim 8, wherein the frame count or the lower bits are reduced in accuracy before being transmitted.

10. A data receiver apparatus for receiving from a digital transmission channel a composite data which comprises moving image data and a specific number of lower bits of a frame count which indicates a start time of a frame of a moving image and has been determined by counting clock pulses of a transmission clock signal used for transmission through the transmission channel during an occurrence interval of a frame pulse which occurs at intervals of the frame of the moving image, comprising:

a clock reproducer for reproducing the transmission clock signal from the composite data;

a separator for separating the lower bits from the composite data;

a frame count reproducer for reproducing the frame count from the lower bits; and a frame reproducer for reproducing the frame pulse from the frame count using the reproduced transmission clock signal.

11. A data receiver apparatus for receiving from a digital transmission channel a composite data which comprises moving image data and a specific number of lower bits of a frame count determined by counting clock pulses of a transmission clock signal used for transmission through the transmission channel during a frame period of the moving image data or a multiple of a divisor of the frame period, comprising:

a clock reproducer for reproducing the transmission clock signal from the composite data;

a separator for separating the specific number of lower bits of the frame count from the composite data;

a frame count reproducer for reproducing the frame count by merging the specific number of lower bits of the frame count with upper bits of a reference which comprises a product of an integer and a power of 2; and a frame reproducer for reproducing the frame period from the frame count using the reproduced transmission clock signal.

12. A data transmitter and receiver system for transmitting moving image data from a data transmitter apparatus via a digital transmission channel to a data receiver apparatus, the data transmitter apparatus comprising:

(a) a clock generator for generating a transmission clock signal used for transmission through the digital transmission channel;

(b) a counter responsive to a frame pulse which is inputted together with the moving image data at intervals of a frame of a moving image for counting clock pulses of the transmission clock signal during each of said intervals to produce a frame count which indicates a start time of the frame of the moving image counted by the clocks of the transmission clock signal;

(c) a data mixer for merging the frame count with the moving image data to produce a composite data; and (d) a transmitter for transmitting the composite data produced by the data mixer, and the data receiver apparatus including:

(a) a clock reproducer for reproducing the transmission clock signal from the composite data;

(b) a separator for separating the frame count from the composite data transmitted via the digital transmission channel from the data transmitter apparatus; and (c) a frame reproducer for reproducing the frame period from the frame count in response to the reproduced transmission clock signal.

13. A data transmitter and receiver system according to claim 12, wherein the frame count is reduced in accuracy before being transmitted from the data transmitter apparatus.

14. A data transmitter and receiver system for transmitting moving image data from a data transmitter apparatus via a digital transmission channel to a data receiver apparatus, the data transmitter apparatus comprising:
(a) a counter for counting a frame period of the moving image data or a multiple of a divisor of the frame period in synchronization with a transmission clock signal used for transmission through the digital transmission channel to produce a frame count;
(b) a difference generator for generating a difference between the frame count and a reference corresponding to a reference to be used by the data receiver apparatus;
(c) a data mixer for merging the difference with the moving image data to produce a composite data; and
(d) a transmitter for transmitting the composite data produced by the data mixer, and the data receiver apparatus comprising:
(a) a clock reproducer for reproducing the transmission clock signal from the composite data;
(b) a separator for separating the difference from the composite data transmitted via the digital transmission channel from the data transmitter apparatus; and
(c) a frame reproducer for reproducing the frame count by adding the difference to the reference; and
(d) a frame reproducer for reproducing the frame period from the frame count using the reproduced transmission clock signal.

15. A data transmitter and receiver system according to claim 14, wherein if the transmission clock signal is (30×n) MHz, the reference corresponding to a reference to be used by the data receiver apparatus is expressed as $30 \times 2^{15} \times n$ for a 525/60, 1125/60 or 1050/60 TV signal format and $36 \times 2^{15} \times n$ for a 625/50 or 1250/50 TV signal format.

16. A data transmitter and receiver system according to claim 14, wherein the frame count or the difference is reduced in accuracy before being transmitted from the data transmitter apparatus.

17. A data transmitter and receiver system for transmitting moving image data from a data transmitter apparatus via a digital transmission channel to a data receiver apparatus, the data transmitter apparatus comprising:
(a) a clock generator for generating a transmission clock signal used for transmission through the digital transmission channel;
(b) a counter responsive to a frame pulse which is inputted together with the moving image data at intervals of a frame for a moving image for counting clock pulses of the transmission clock signal during each of said intervals to produce a frame count which indicates a start time of the frame of the moving image counted by the clock pulses of the transmission signal;
(c) a lower-bit generator for separating a specific number of lower bits from the frame count produced by the counter;
(d) a data mixer for merging the lower bits with the moving image data to produce a composite data; and
(e) a transmitter for transmitting the composite data produced by the data mixer, and the data receiver apparatus comprising:
(a) a clock reproducer for reproducing the transmission clock signal from the composite data;
(b) a separator for separating the lower bits from the composite data transmitted via the digital transmission channel from the data transmitter apparatus;
(c) a frame count reproducer for reproducing the frame count from the lower bits; and
(d) a frame reproducer for reproducing the frame pulse from the frame count using the reproduced transmission clock signal.

18. A data transmitter and receiver system according to claim 17, wherein the frame count, or the lower bits are reduced in accuracy before being transmitted from the data transmitter apparatus.

19. A data transmitter and receiver system for transmitting moving image data from a data transmitter apparatus via a digital transmission channel to a data receiver apparatus;

the data transmitter apparatus comprising:
(a) a counter for counting a frame period of the moving image data or a multiple of a divisor of the frame period in synchronization with a transmission clock signal used for transmission through the digital transmission channel to produce a frame count;
(b) a lower bit generator for separating a specific number of lower bits from the frame count produced by the counter;
(c) a data mixer for merging the specific number of lower bits with the moving image data to produce a composite data; and
(d) a transmitter for transmitting the composite data produced by the data mixer, and the data receiver apparatus comprising:
(a) a clock reproducer for reproducing the transmission clock signal from the composite data;
(b) a separator for separating the specific number of lower bits from the composite data transmitted via the digital transmission channel from the data transmitter apparatus;
(c) a frame count reproducer for reproducing the frame count by merging the specific number of lower bits with the upper bits of the reference which comprises a product of an integer and a power of 2; and
(d) a frame reproducer for reproducing the frame period from the frame count using the reproduced transmission clock signal.

20. A data transmitter and receiver system according to claim 19, wherein if the transmission clock signal is (30×n) MHz, where n is an integer, the reference is expressed as $30 \times 2^{15} \times n$ for a 525/60, 1125/60 or 1050/60 TV signal format and $36 \times 2^{15} \times n$ for a 625/50 or 1250/50 TV signal format.

21. A data transmitter and receiver system according to claim 19, wherein the frame count, or the lower bits are reduced in accuracy before being transmitted from the data transmitter apparatus.

\* \* \* \* \*